United States Patent
Sumser et al.

(10) Patent No.: US 6,957,535 B2
(45) Date of Patent: Oct. 25, 2005

(54) VARIABLE EXHAUST-GAS TURBOCHARGER WITH AN AUXILIARY DRIVE FOR AN INTERNAL COMBUSTION ENGINE

(75) Inventors: Siegfried Sumser, Stuttgart (DE); Peter Fledersbacher, Stuttgart (DE); Helmut Finger, Leinfelden-Echterdingen (DE); Manfred Stute, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/988,406

(22) Filed: Nov. 10, 2004

(65) Prior Publication Data

US 2005/0091978 A1 May 5, 2005

Related U.S. Application Data

(63) Continuation-in-part of application No. PCT/EP03/03118, filed on Mar. 26, 2003.

(51) Int. Cl.[7] .................. F02B 33/44; F02B 37/10; F02B 37/22
(52) U.S. Cl. .................. 60/607; 60/608; 60/612
(58) Field of Search .................. 60/602, 607, 608, 60/612; 123/526, 565; 415/157, 158, 166; 417/407

(56) References Cited

U.S. PATENT DOCUMENTS

| | | | |
|---|---|---|---|
| 3,570,240 A | * | 3/1971 | Melchior .................. 60/611 |
| 5,025,629 A | | 6/1991 | Woollenweber .................. 60/602 |
| 5,560,208 A | | 10/1996 | Halimi et al. .................. 60/608 |
| 5,611,202 A | | 3/1997 | Sumser et al. .................. 60/612 |
| 6,378,307 B1 | * | 4/2002 | Fledersbacher et al. ........ 60/612 |
| 6,634,174 B2 | * | 10/2003 | Sumser et al. .................. 60/602 |
| 6,637,205 B1 | * | 10/2003 | Ahmad et al. .................. 60/607 |
| 2005/0091978 A1 | * | 5/2005 | Sumser et al. .................. 60/612 |

FOREIGN PATENT DOCUMENTS

| | | |
|---|---|---|
| DE | 34 43 324 | 8/1986 |
| DE | 38 18 230 | 12/1989 |
| DE | 41 19 657 | 12/1992 |
| DE | 41 33 736 | 10/1993 |
| DE | 42 13 047 | 10/1993 |
| DE | 38 26 600 | 3/1998 |
| DE | 100 24 390 | 12/2000 |
| DE | 199 55 508 | 4/2001 |
| DE | 100 61 847 | 6/2002 |
| FR | 2 396 869 | 2/1979 |
| GB | 2 118 621 | 11/1983 |
| GB | 2 172 340 | 9/1986 |
| JP | 01 315616 | 12/1989 |
| JP | 02 119629 | 5/1990 |
| JP | 04 019328 | 1/1992 |

* cited by examiner

*Primary Examiner*—Sheldon J Richter
(74) *Attorney, Agent, or Firm*—Klaus J. Bach

(57) ABSTRACT

In a variable exhaust gas turbocharger for an internal combustion engine including an exhaust gas turbocharger to which exhaust gas is supplied from the engine to provide a torque for driving the turbocharger, an additional device is provided which includes an electrical or mechanical drive for supplying an additional torque to the exhaust gas turbocharger in order to maintain the exhaust gas turbocharger at a certain speed at which it is capable of generating a desired inlet air pressure for the charge air supplied to the internal combustion engine.

11 Claims, 3 Drawing Sheets

VARIABLE EXHAUST-GAS TURBOCHARGER WITH AN AUXILIARY DRIVE FOR AN INTERNAL COMBUSTION ENGINE

This is a Continuation-In-Part Application of International application PCT/EP03/03118 filed Mar. 26, 2003 and claiming the priority of German application 102 21 014.4 filed May 11, 2002.

BACKGROUND OF THE INVENTION

The invention relates to a variable exhaust gas turbocharger of an internal combustion engine with an exhaust gas turbine and a compressor with at least one adjustable flow control element in the suction area. The exhaust gas turbocharger has a housing including a turbine wheel and a compressor wheel connected to the turbine wheel by a common shaft. An engine exhaust duct is connected to the housing to supply exhaust gas to the turbine wheel for generating a drive torque.

Since the beginning of the development of charged internal combustion engines for use in motor vehicles the improvement of the unsteady behavior, particularly in connection with passenger cars, was considered to be of prime importance. The unsteady behavior of a charged internal combustion engine is determined mainly by the properties of the exhaust gas turbocharger. The development of turbochargers was directed, in addition to seeking variability at the turbine side, mainly to a minimizing the mass of the rotor and, at the same time, an increase of the maximum rotor speed of the turbocharger. This means that, with increasing degrees of charging, which will be necessary in the future in connection with emission controls to an increasing degree, very high speed ranges of the exhaust gas turbocharger must be accommodated during transient operations, for example, in city traffic.

The positive effects of the exhaust gas turbochargers on the efficiency of an engine for use in passenger cars are widely recognized. However attention for overcoming the unsteady behavior has mainly been given to improvements concerning reduced wheel volumes. The efficiency potential of the turbocharger which is very important for good operating characteristics of future low-consumption vehicles can not be adequately obtained with the direction of present developments on the charger units for improving the unsteady behavior and increasing the specific engine power output.

DE 199 55 508 C1 discloses a variable exhaust gas turbocharger for an internal combustion engine which includes an exhaust gas turbine and a compressor for generating compressed charge air. In addition, the internal combustion engine includes an air-driven turbine which is connected for rotation with the compressor and to which combustion air can be supplied by way of an adjustable valve structure. The turbine outlet is in communication with the engine intake duct downstream of the compressor by way of a connecting duct. The internal combustion engine includes a control unit for generating control signals for operating the valve structure.

For admitting the air to the air-driven turbine, an additional duct branches off the intake duct upstream of the compressor. The air supply to the additional duct and to the compressor inlet is adjustable by the valve structure. If in a low load range, the desired charge air pressure drops below a threshold value, a control signal is generated in the control unit by which the valve structure is moved to a position in which the additional duct is opened and the air admission to the compressor inlet is reduced.

It is the object of the present invention to provide a variable exhaust gas turbocharger which has an improved efficiency without turbo hesitation (the so-called turbo-lag).

In contrast to the development trend which assumes the high rotational speed changes of the turbocharger in a turbocharged motor as a given fact, the considerations on which the present invention is based are intended to provide an arrangement in which the turbocharger is subjected to only relatively small speed changes so that the turbocharger operates at a high speed level over the whole engine performance range.

SUMMARY OF THE INVENTION

In an internal combustion engine including an exhaust gas turbocharger to which exhaust gas is supplied from the engine to provide a first torque for driving the turbocharger, an additional device is provided which includes an electrical or mechanical drive for supplying a second torque to the exhaust gas turbocharger in order to maintain the exhaust gas turbocharger at a certain speed at which it is capable of generating a desired inlet air pressure for the charge air supplied to the internal combustion engine.

As a result, the mass inertia of the exhaust gas turbocharger no longer has disadvantageous effects since, with an essentially constant speed of the exhaust gas turbocharger over the whole engine performance range, no speed changes of the turbocharger need to be accommodated. The pressure energy available at the exhaust side is used for charging, the energy amount which was needed so far for the acceleration of the exhaust gas turbocharger is now available additionally for charging.

In conventional charging systems, rotational speed ranges between a low speed of 10,000 rpm and a top speed of 200,000 rpm, that is a difference of 190,000 rpm are not unusual. The arrangement according to the invention allows for rotational speed variations of maximally 30,000 rpm relative to a base design speed of the exhaust gas turbocharger.

It is of particular importance for the present invention that the supplementary unit is a compressor which is driven either electrically or mechanically. The charge air which is inducted by way of a charge air inlet and is compressed by the auxiliary unit is conducted by way of a supplement duct directly onto the compressor wheel. Alternatively, or in combination, the charge air inducted by way of the air inlet and compressed is directed by way of a turbine inlet passage onto the turbine wheel.

The mass and impulse flow introduced in this way generates, by an aerodynamic coupling, the additional torque required for accelerating the exhaust gas turbocharger or for keeping the exhaust gas turbocharger at its design speed. In order to control the impulse flow, the speed of the exhaust gas turbocharger is constantly measured and the value is processed by a control unit. The compressor is driven by the crankshaft of the internal combustion engine via a V-belt drive or by an electric motor. In order to be able to switch a crankshaft driven compressor on and off a clutch is provided between the drive wheel and the compressor shaft.

In connection with the arrangement according to the present invention, it is also advantageous if the auxiliary unit includes an electric motor which supplies a drive torque directly to the shaft of the exhaust gas turbocharger. To this end, the electric motor is connected to the drive shaft of the turbocharger by way of a clutch and a transmission. By way of the control unit, the clutch and the speed of the electric motor are so controlled that the exhaust gas turbocharger is accelerated to its base design speed or is maintained about at design speed.

In order to reduce losses, the shaft of the exhaust gas turbocharger is supported in the housing by an air bearing structure. Alternatively, however, an antifriction bearing, a friction bearing or a magnetic bearing may be used.

In order to supply the second torque directly to the compressor wheel and to make the desired compressor or turbine operation possible, it is advantageous if the compressor includes a main inlet passage by way of which charge air is admitted in both operational modes. In addition, the main inlet passage branches into an axial inlet passage and an additional passage. The axial inlet passage includes a throttling device for changing its flow cross-section.

In this connection, it is advantageous if the compressor wheel has an axial inlet area and a radial outlet area.

The axial inlet area can be throttled during turbine operation of the compressor to the maximum extent so that the charge air can enter only by way of the main inlet passage. Excessive speed of the exhaust gas turbocharger can be avoided in this operational state by such throttling. During the operation of the compressor, the charge air flows can also be controlled by the throttling structure.

It is furthermore advantageous if the additional axial passage joins—in flow direction ahead of the compressor wheel—an additional radial passage. The air entering from the additional passage is redirected by the compressor wheel in the flow direction. In the radial additional passage, a radial guide vane structure is provided which may be adjustable.

With the speed control of the exhaust gas turbocharger according to the invention, the diameter of the turbine wheel and the compressor wheel can be increased so that the compressor as well as the exhaust gas turbine may be provided with purely radial flow passages.

It is also possible to provide in the housing downstream of the compressor wheel, a radial diffuser vane structure as a further control element. The diffuser vanes are in a simple embodiment in the form of a stationary non-adjustable structure. The compressor wheel is in this case, a purely radial compressor wheel.

It is furthermore advantageous if the exhaust gas turbine has—with respect to the axis of rotation of the turbine wheel—a radial and an axial inlet flow passage. Both flow passages are optionally provided with an adjustable exhaust gas guide vane structure.

In another embodiment, the radial inlet flow passage includes a variable guide vane structure by means of which the turbine inlet flow can be throttled. The variable guide vane structure is supported in the housing so as to extend axially and is controllable.

In accordance with a preferred embodiment of the invention, the variable exhaust gas turbocharger is connected to a control system of an internal combustion engine. The control system includes a control unit, which receives actual operating value signals from several pressure sensors in the control system and for example receives also an actual speed signal of the turbocharger from the internal combustion engine. The control unit sends corresponding control signals to one or several control devices of the system. These control devices control in a preferred embodiment the auxiliary drive unit, the throttle structure in the main inlet flow passage, an exhaust gas recirculation valve and the variable turbine inlet passage guide vane structure.

With the user of the auxiliary unit, the system may be provided with a purely radial compressor. The radial compressor then includes an adjustable guide vane structure or an adjustable diffuser vane structure upstream and, respectively, downstream of the compressor wheel.

With the arrangement according to the invention for example a method for controlling the speed of a variable exhaust gas turbocharger may be provided. In a first step, the speed of the exhaust gas turbocharger is adjusted within the engine performance range to an average desired speed. Within the engine performance range, the speed may deviate, supported by the torque generated by the auxiliary unit, maximally by 20% from the average desired speed. Acceleration of the exhaust gas charger is therefore needed only to a limited degree.

For reaching the constant speed or, respectively, for accelerating the exhaust gas turbocharger, maximally 10% of the nominal compressor power should be provided by the auxiliary unit to the variable exhaust gas turbocharger. It is apparent therefore that the auxiliary unit is only to be engaged as a supplemental device that is not for the basic acceleration of the turbocharger.

The invention will become more readily apparent from the following description thereof on the basis of the accompanying drawings.

DESCRIPTION OF A PREFERRED EMBODIMENT

Figure 1:
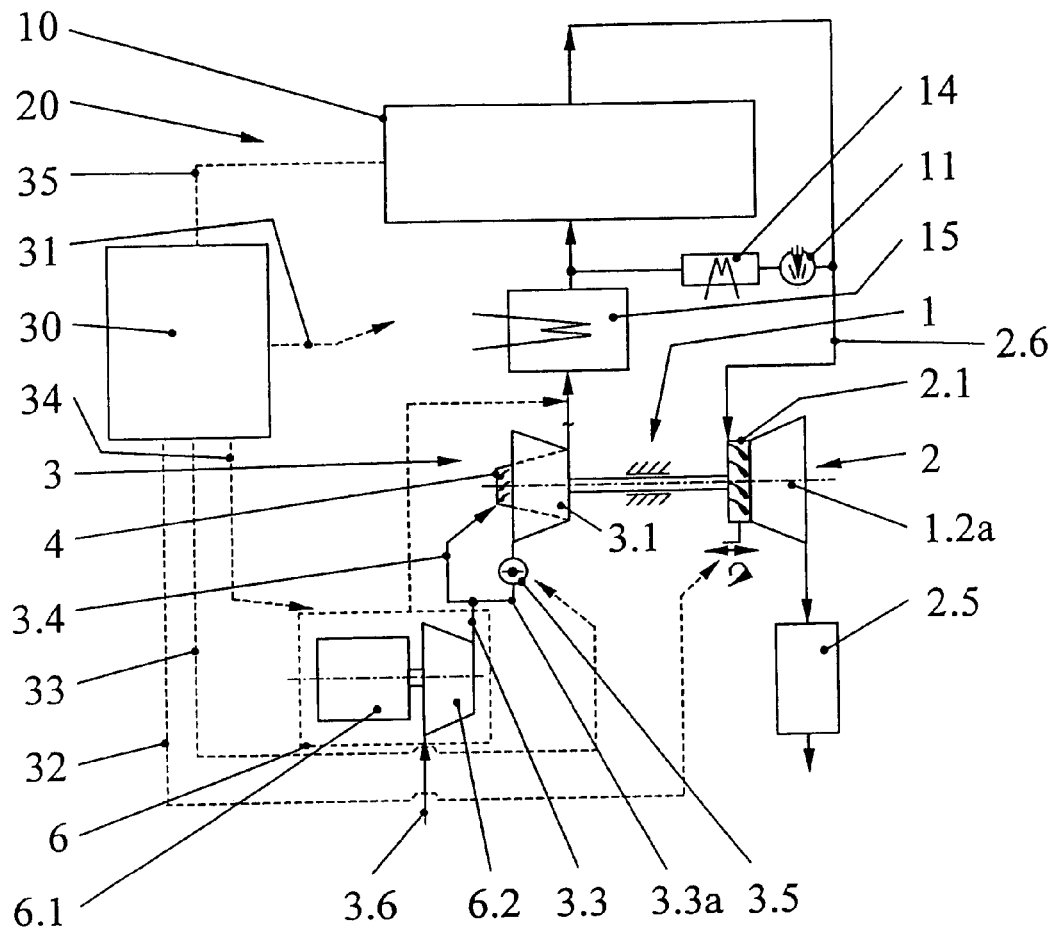
FIG. 1 shows schematically a system for controlling an internal combustion engine.

FIG. 1 shows schematically an exhaust gas turbocharger with an associated control system 20 of an internal combustion engine 10. The exhaust gas turbocharger 1 includes an exhaust gas turbine 2 with an adjustable inlet vane structure for adjusting the inlet flow cross-section 21 to which exhaust gas is supplied from the engine 10 by way of the exhaust duct 2.6. From the turbine 2, the exhaust gas is discharged by way of a catalytic converter 2.5.

The turbine 2 is coupled to a compressor 3, which includes a main inlet duct 3.3 and a compressor wheel 3.1. The main inlet duct 3.3 branches into an inlet duct 3.3a and an additional duct 3.4. The inlet duct 3.3a includes a throttling device 3.5 for controlling the gas flow therethrough. In the additional duct 3.4, a radial guide vane structure 4 is arranged in front of the compressor wheel 3.1.

Depending on the operating state, the charge air supply to the inlet duct 3.3a is controlled by way of the throttling device 3.5. During turbine operation of the compressor 3, the inlet duct 3.3a is closed by the throttling device 3.5.

Between the charge air inlet 36 and the main inlet 3.3, for example, a compressor 6 is installed. The compressor 6 is mechanically or electrically driven and has a reserve volume coupled aerodynamically with the compressor wheel 3.1. With this aerodynamic coupling an additional torque is introduced to the turbocharger by way of the compressor wheel 3.1. The compressor 6 comprises a transmission 6.1 and a pump 6.2. The main purpose of the introduction of the additional energy by the compressor 6 is to compensate for any energy deficit of the exhaust gas turbine 2 at any operating point of the internal combustion engine 10. In this way, the speed of the exhaust gas turbocharger 1 is maintained almost constant at the stationary speed $n_{ATL,St}$ within the predetermined speed range. The stationary speed $n_{ATL,St}$ is within a lower and an upper speed $n_u < n_{ATL,St} < n_0$.

The additional compressor 6 may also be arranged downstream of the compressor 3. In the turbine- or, respectively, cold air turbine operation, the pressure ratio is increased in this case by the suction effect when the compressor 3 is operated as a turbine. In the downstream version however, the inlet temperature $T_1$ of the compressor 3 is not increased as it would be advantageous for the turbine operation with the additional compressor 6 arranged upstream of the compressor 3.

A control unit 30 receives actual operating values 35 of the internal combustion engine 10 and sends control signals 31, 32, 34 to the actuating devices of the various system components. These are the compressor 6, the throttle 3.5, the adjustable turbine inlet vane structure 2.1 and an exhaust gas recirculation valve 11.

The engine intake and exhaust condition values which are partially determined also by the operation of the exhaust gas turbocharger 1 require during operation with exhaust gas recirculation a monitoring of the exhaust gas recirculation valve 11. Of particular interest of the intake and exhaust condition values are various pressures in the control system 20 of the internal combustion engine.

In the arrangement shown, the exhaust gas recirculation valve 11 is arranged upstream of an exhaust gas recirculation cooler 14. The exhaust gas is admixed to the intake air downstream of the exhaust gas recirculation cooler 14 near the inlet of the intake air to the internal combustion engine 10 in order to avoid contaminations.

Figure 2:
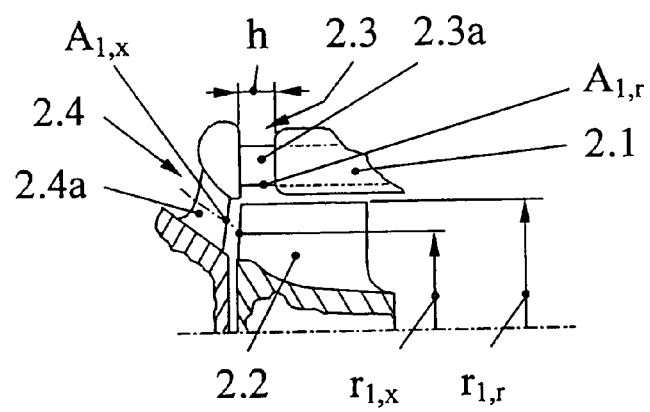
FIG. 2 shows a section of an exhaust gas turbine with an axial and a radial inlet flow passage.

FIG. 2 shows the entrance area of the exhaust gas turbine 2 in a cross-sectional view. Exhaust gas is admitted to the turbine wheel 2.2 by an axial flow 2.4 via an axial inlet passage $A_{1,x}$ and a radial flow 2.3 via a radial inlet passage area $A_{1,r}$. The radial inlet passage 2.3 is provided with a radial exhaust gas guide vane structure 2.3a. The flow cross section of the radial flow passage has a variable gap width h. The axial flow passage 2.4 includes an axial guide vane structure 2.4a.

For calculating the turbine efficiency η, an axial turbine inlet radius $r_{1,x}$ corresponding to the axial inlet passage 2.4 and a radial turbine radius $r_{1,r}$ corresponding to the radius at the radial inlet flow passage 2.3 are used.

Figure 3:
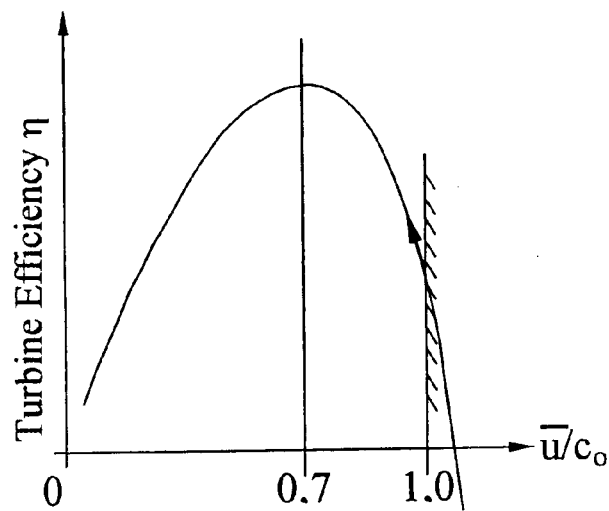
FIG. 3 shows a diagram of the turbine efficiency depending on the ratio of the average stationary circumferential speed and the isentropic speed.

FIG. 3 shows the efficiency η depending on the ratio $u/c_0$, that is, the ratio of the average stationary circumferential speed u over the isentropic speed $c_0$. The average stationary circumferential speed u is calculated from the product of the average radius of the turbine wheel 2.2 and a stationary angular speed to be $u = r \times \omega_{stationary}$.

In the low and intermediate load ranges, the isentropic speed $c_0$ or, respectively, the turbine pressure ratio and the turbine inlet temperature are relatively low. This results in a high value for the ratio $u/c_0$. The design aim with regard to a high efficiency η is at $u/c_0 \leq 1$. By designing the exhaust gas turbine 2 and by a suitable selection of a combination type of an exhaust gas turbo charger 1, the average stationary circumferential speed u can be depressed. In the present exemplary embodiment, the optimum of the ratio $u/c_0$ is at a value of 0.7.

Figure 4:
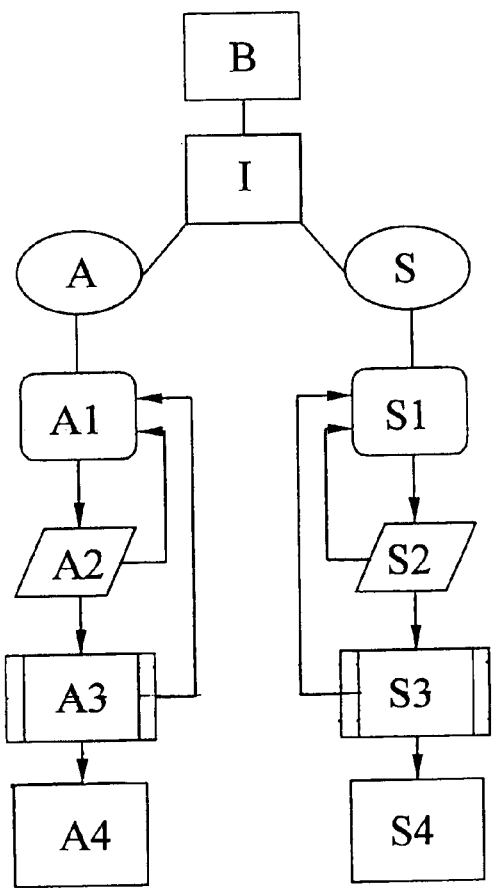
FIG. 4 shows a control scheme for a speed-stationary charging.

An exhaust gas turbocharger 1 designed in accordance with FIG. 3 is controlled with a control scheme as indicated in FIG. 4. The control scheme is dependent on the pressures: the pressure $p_0$ ahead of the compressor 3, the pressure $p_1$ ahead of the compressor wheel 3.1 and the pressure $p_2$ downstream of the compressor wheel 3.1.

Generally the equation applies $P_2/P_0 = P_2/P_1 \times P_1/P_0$. During suction operation, the following conditions should apply:

$$P_2/P_1 < 1 \text{ and } P_1/P_0 \geq \text{or } P_1/P_0 < 1 \text{ and } P_2/P_0 < 1$$

During charging operation, these conditions apply:

$$P_2/P_1 \geq 1 \text{ and } P_1/P_0 \geq 1 \text{ or } P_1/P_0 < 1 \text{ and } P_2/P_0 > 1.$$

By the position of the gas pedal, a desired operating point B and consequently a desired mass flow $m_{soll}$ is indicated. In a subsequent step I, the operating point is identified. The identification is based on the ratio $P_2/P_1$ of the compressor discharge pressure and the compressor inlet pressure ahead of, and after, the compressor wheel 3.1.

The charging range A is identified by $P_2/P_1 > 1$.

In the operating point A, the compressor 3 is torque-contributing operation, the radial inlet vane structure 4 is in a throttling position in which the actual mass flow $m_{ist}$ of the engine corresponds about to the desired mass flow $m_{soll}$, that is, $m_{ist} \approx m_{soll}$.

The exhaust gas turbine 2 is controlled in a further step $A_2$ in such a way that the stationary speed $n_{ATL,St}$ of the exhaust gas turbocharger 1 stays between a lower and an upper speed limit within the speed range $n_u < n_{ATL,St} < n_0$.

When the stationary speed $n_{ATL,St}$ falls after step $A_3$ below the lower speed $n_u$ to such an extent that $n_{AT,St} < n_u$, then external energy must be supplied by means of the additional unit 6 and the additional unit 6 can no longer be bypassed. As a result, the pressure $p_1$ ahead of the compressor wheel 3.1 rises so that it is again higher than the pressure $p_0$ ahead of the compressor 3, that is, $P_1/P_0 > 1$. The control is then repeated correspondingly.

The point $A_4$ represents the result of the procedure. A desired operating point has now been reached: $m_{ist} \approx m_{soll}$, $P_2/P_0 > 1$, $n_u < n_{ATL,St} < n_0$. The compressor 3 is not in charging operation with an adjusted co-torque. The co-torque drops with increasing charging rates. The exhaust gas turbine 2 receive a correspondingly increased gas flow and is at an advantageous operating point.

In summary, this means that the throttling and the supplying of the level of the co-torque by the compressor 3 can be controlled as follows:

The engine mass flow $m_{soll}$ must be achievable when the adjustable turbine inlet flow cross-section 2.1 of the exhaust gas turbine 2 provides a performance equilibrium permitting a speed range of $n_u < n_{ATL,St} < n_0$. If the rpm of the exhaust gas turbocharger 1 falls below the lower limit $n_u$ of the stationary speed $n_{ATL,St}$, this trend is counteracted by the addition of outside energy until the exhaust gas turbocharger 1 is almost stationary in the speed range, that is, remains at the high speed level.

The suction range S is identified by $P_2/P_1 < 1$.

At the operating point $S_1$, the compressor 3 is operated as a turbine by means of the radial inlet vane structure 4. Also, in this case, $m_{ist} \approx m_{soll}$.

The exhaust gas turbine 2 is controlled in a further step $S_2$ in such a way that the stationary speed $n_{ATL,St}$ of the exhaust gas turbocharger 1 is within the speed range $n_u < n_{ATL,St} < n_0$.

When the stationary speed $n_{ATL,St}$ drops after the step $S_3$ to such an extent that $n_{ATL,St} < n_u$, the addition of outside energy by means of the additional unit 6 is necessary. Then again the state $P_1/P_0 > 1$ is established. The control is then repeated accordingly.

At the end $S_4$ of this procedure, a desired operating point is reached wherein $m_{ist} \approx m_{soll}$, $P_2/P_0 < 1$, $n_u < n_{ATL,St} < n_0$. The compressor 3 is then in an operating state with an adjusted co-torque. As the engine load increases, the co-torque drops. The exhaust gas turbine 2 is provided with an additional gas flow and is operating at an advantageous operating point. The compressor is in the suction operating range mostly in the turbine operating mode.

In the suction operating range of the internal combustion engine a pressure differential is established by means of the throttle 3.5, or by the adjustable radial inlet guide vane structure 4 forming a co-torque, whereby the compressor 3 changes to a cold air turbine operation. Then the bearings of the turbine are the only power consumer since the compressor does not consume any power. Outside energy is then added only when the high stationary speed $n_{ATL,St}$ of the exhaust gas turbocharger 1 appears to drop below the lower limit $n_u$. Over-speeding of the exhaust gas turbocharger 1 is prevented essentially by opening the adjustable turbine inlet passage 2.1.

The range which is most difficult to control is at a ratio $P_2/P_0=1.0$.

Figure 5:
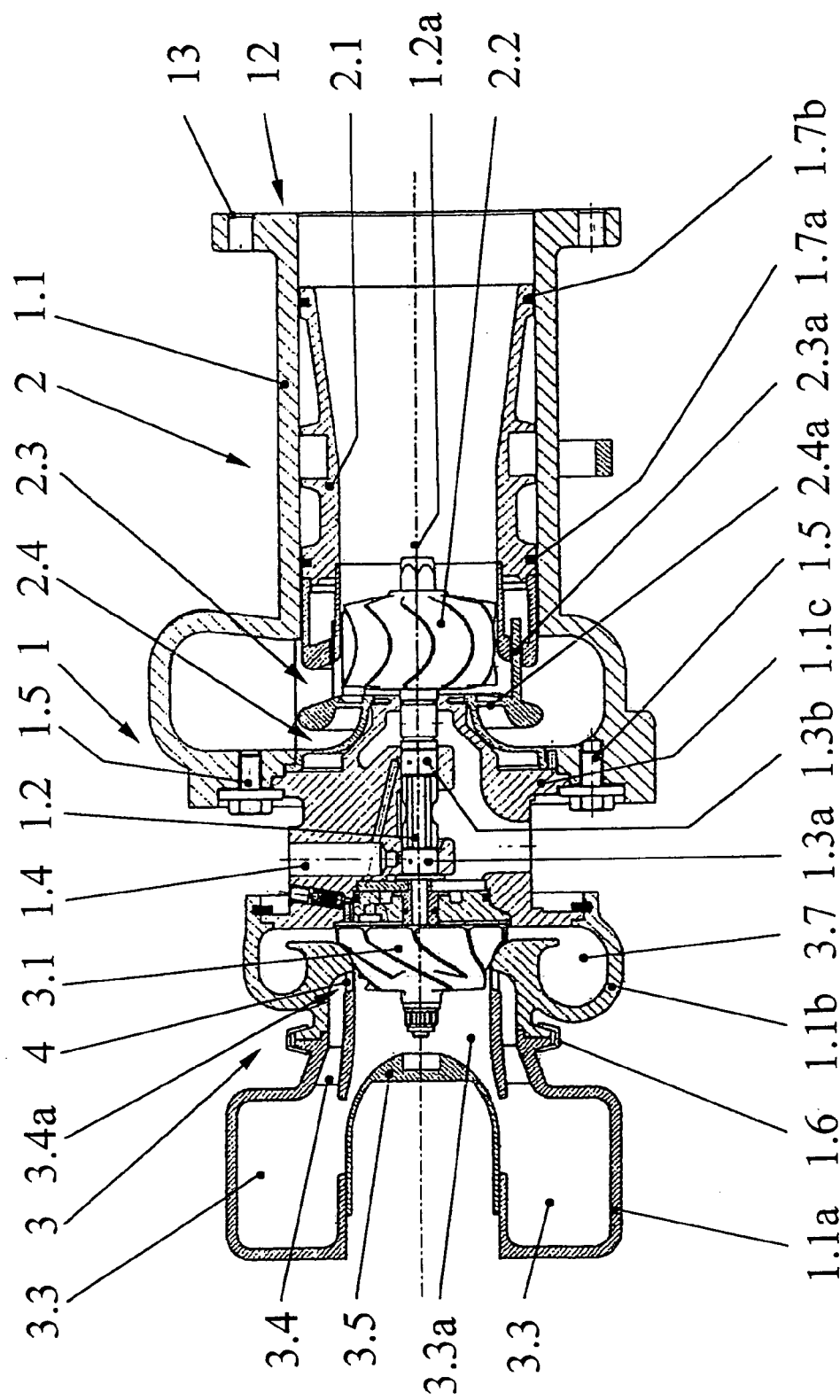
FIG. 5 is a cross-sectional view of a turbocharger suitable for speed-stationary charging.

FIG. 5 shows the exhaust gas turbocharger 1 in a cross-sectional view as it is suitable for the constant-speed charging of an engine. The exhaust gas turbine 2 is connected for rotation with the compressor 3 by the shaft 1.2. The inlet side of the compressor 3 is formed by a first housing area 1.1*a* and the outlet side is formed by a second housing area 1.1*b*. The shaft 1.2 is supported in a third housing area 1.1*c*. The housing 1-1 forms an inlet and an outlet area of the turbine. As shown in FIG. 2, the turbine has a radial gas inlet passage 2.3 and an axial inlet passage 2.4, each provided with an exhaust gas guide vane structure 2.3*a*, 2.4*a*. The flow cross-section of the radial inlet flow passage 2.3 is adjustable by axial movement of the slide member 2.1. The axial adjustment affects the effective vane width of the radial exhaust gas guide vane structure 2.3*a* and consequently the back pressure of the exhaust gas turbine 2. The adjustable slide member 2.1 is axially movably supported in the housing 1.1 of the exhaust gas turbocharger 1 and is sealed relative to the housing 1.1 by seals 1.7*a* and 1.7*b*. The housing parts 1.1*a*, 1.1*b* are interconnecting by connecting clamp 1.6. The housing 1.1*c* is connected to the turbine housing 1.1 by screws 1.5.

The compressor wheel 3.1 is supplied with gas radially by way of the additional duct 3.4 and axially by way of the inlet passage 3.3*a*. Both passages branch off from the main inlet duct 3.3. The inlet passage 3.3*a* is controllable by an axially movable controllable throttling member 3.5.

The additional duct 3.4 is controllable by a radial guide vane structure 4, which is arranged in flow direction directly in front of the compressor wheel 3.1. The combination of the radial inlet guide vane structure 4 and the throttle flap 3.5 makes a cold air turbine operation of compressor structure possible. Upon being compressed, the charge air flows to an outlet 3.7 and on to the internal combustion engine 10.

As apparent from FIG. 5, the exhaust gas turbine 2 was designed with the described efficiency optimization in mind, which provides for a relatively large wheel volume. With the concept of the stationary turbo-charging according to the invention a relatively high inertia mass can not only be advantageous for achieving a good efficiency but also serve as energy storage structure. The disadvantages of the high inertia mass are eliminated by the relatively constant speed of the exhaust gas turbocharger according to the invention.

The bearings 1.3*a*, 1.3*b* of the shaft 1.2 are in the form of friction bearings to which lubricating oil is supplied by way of lubricant passages 1.4. The housing 1.1 includes a flange 1.2 to which the exhaust gas duct extending from the turbine is connected by a flange connection 13.

What is claimed is:

1. A variable exhaust gas turbocharger (1) for an internal combustion engine (10), comprising an exhaust gas turbine (2) including a housing having a turbine inlet flow passage (2.3) with a variable flow cross-section, a turbine wheel (2.2), a charge air compressor (3) with a charge air compressor wheel (3.1) disposed in said housing, a shaft (1.2) rotatably supported in said housing and carrying both said turbine wheel (2.2) and said compressor wheel (3.1), means for conducting exhaust gas from said combustion engine (10) to said turbine wheel (22) for driving the turbine wheel (2.2) with a first torque, an additional device (6) disposed in communication with said exhaust gas turbocharger (1) for supplying a second torque to said exhaust gas turbocharger, said additional device (6) being a compressor with a charge air inlet (3.6) and a charge air outlet (3.3) in communication with the compressor inlet of the exhaust gas turbocharger for supplying a second torque to the compressor wheel (3.1) and the turbocharger shaft, said charge air outlet of said additional compressor (6.2) including a main flow duct branching into two separate ducts, one being connected to an additional axial inlet duct (3.4) of the charge air compressor (3) and the other extending to a radial inlet duct (3.3*a*) of said compressor, said additional device (6) being driven by one of a mechanical drive and an electric motor.

2. A variable exhaust gas turbocharger according to claim 1, wherein the additional compressor (6.2) is connected to the inlet of the charge air compressor (3) of the turbocharger.

3. A variable exhaust gas turbocharger according to claim 1, wherein the inlet (3.3*a*) of the charge air compressor (3) of the turbocharger includes a throttling device (3.5) for changing the flow cross-section of the inlet (3.3*a*).

4. A variable exhaust gas turbocharger according to claim 1, wherein the charge air compressor wheel (3.1) has an axial inlet area and a radial outlet area.

5. A variable exhaust gas turbocharger according to claim 1, wherein the additional axial inlet duct (3.4) is connected upstream of the charge air compressor wheel (3.1) to an additional radial inlet flow passage (3.4*a*) and an adjustable guide vane structure is disposed in the additional radial inlet flow passage (3.4*a*).

6. A variable exhaust gas turbocharger according to claim 1, wherein downstream of the charge air compressor wheel (3.1) an adjustable diffuser guide vane structure is arranged in the housing (1.1) and the compressor wheel (3.1) is a radial compressor wheel.

7. A variable exhaust gas turbocharger according to claim 1, wherein the exhaust gas turbocharger (1) is connected to a control system (20) of the internal combustion engine (10), the control system (20) includes a control unit (30) which receives actual values (35) of the internal combustion engine and several pressure sensors included in the control system, and the control system (30) supplies control signals (31, 32, 33, 34) to control devices controlling the operation of the exhaust gas turbocharger.

8. A variable exhaust gas turbocharger according to claim 1, wherein the exhaust gas turbine (2) includes a, with respect to the axis of rotation of (1.2*a*) of the turbine wheel (2.2), radial inlet passage (2.3) including a radial guide vane structure (2.3*a*) and an axial inlet flow passage (2.4) with an axial exhaust gas guide vane structure (2.4*a*) and at least one of the guide vane structures (2.3*a*, 2.4*a*) is adjustable.

9. A variable exhaust gas turbocharger according to claim 7, wherein the radial inlet passage (2.3) of the turbine (2) has a variable flow cross-section (2.1).

10. A variable exhaust gas turbocharger according to claim 1, wherein means are provided for providing to the exhaust gas turbocharger a second torque—in addition to the torque supplied by the engine exhaust gas so that the turbocharger is maintained at a high speed and the speed of the turbocharger (1) is maintained within a 20% range of a desired speed.

11. A variable exhaust gas turbocharger according to claim 10, wherein maximally 10% of the nominal compressor power input is supplied to the exhaust gas turbocharger (1) by the additional unit (6).

* * * * *